US010613986B2

(12) United States Patent
Ash et al.

(10) Patent No.: US 10,613,986 B2
(45) Date of Patent: *Apr. 7, 2020

(54) ADJUSTMENT OF THE NUMBER OF TASKS FOR A CACHE STORAGE SCAN AND DESTAGE APPLICATION BASED ON THE TYPE OF ELEMENTS TO BE DESTAGED FROM THE CACHE STORAGE (71) Applicant: International Business Machines Corporation, Armonk, NY (US)

(72) Inventors: Kevin J. Ash, Tucson, AZ (US); Lokesh M. Gupta, Tucson, AZ (US); Brian A. Rinaldi, Tucson, AZ (US); Micah Robison, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/397,929

(22) Filed: Apr. 29, 2019

(65) Prior Publication Data
US 2019/0258578 A1    Aug. 22, 2019

Related U.S. Application Data (63) Continuation of application No. 15/348,668, filed on Nov. 10, 2016, now Pat. No. 10,318,429.

(51) Int. Cl.
*G06F 12/0868* (2016.01)
*G06F 12/128* (2016.01)
(Continued)

(52) U.S. Cl.
CPC ........ *G06F 12/0868* (2013.01); *G06F 12/126* (2013.01); *G06F 12/128* (2013.01); *G06F 12/12* (2013.01)

(58) Field of Classification Search
CPC .... G06F 12/0868; G06F 12/12; G06F 12/126; G06F 12/128
See application file for complete search history.

(56) References Cited

U.S. PATENT DOCUMENTS 8,127,084 B2 ‡ 2/2012 Gill ..................... G06F 12/0804
711/10
9,280,485 B2 ‡ 3/2016 Ash ..................... G06F 12/0802
(Continued)

OTHER PUBLICATIONS

US Patent Application, dated Nov. 10, 2016, for U.S. Appl. No. 15/348,668 (18.683), filed Nov. 10, 2016, invented by Kevin J. Ash et al., Total 36 pages.
(Continued)

*Primary Examiner* — Larry T Mackall
(74) *Attorney, Agent, or Firm* — Rabindranath Dutta; Konrad, Raynes, Davda and Victor LLP (57) ABSTRACT

A determination is made in a multi-processor system that a cache storage is storing a first type of elements and a second type of elements, wherein on an average each of the first type of elements takes a longer time to destage to secondary storage in comparison to each of the second type of elements. A determination is made of how many tasks to run for scanning the cache storage and destaging the first type of elements and the second type of elements from the cache storage, based on how many of first type of elements and how many of the second type of elements are stored in the cache storage, and how many processors are available in the multi-processor system.

15 Claims, 10 Drawing Sheets

(51) Int. Cl.
*G06F 12/126* (2016.01)
*G06F 12/12* (2016.01)

(56) References Cited

U.S. PATENT DOCUMENTS

| | | | |
|---|---|---|---|
| 2003/0070041 A1 ‡ | 4/2003 | Beardsley | G06F 11/0724 |
| | | | 711/113 |
| 2013/0235709 A1 ‡ | 9/2013 | Benhase | G11B 21/025 |
| | | | 369/47.12 |
| 2013/0326272 A1 ‡ | 12/2013 | Yochai | G06F 12/0868 |
| | | | 714/15 |
| 2015/0378929 A1 ‡ | 12/2015 | Benhase | G06F 12/0806 |
| | | | 711/10 |
| 2016/0253107 A1 ‡ | 9/2016 | Ash | G06F 12/12 |
| | | | 711/15 |
| 2017/0010965 A1 ‡ | 1/2017 | Hsu | G06F 12/0804 |

OTHER PUBLICATIONS

List of Patents and Applications Treated as Related, dated Oct. 29, 2019, Total 2 pages.
Office Action, dated Jul. 25, 2018, for U.S. Appl. No. 15/348,668 (18.683), filed Nov. 10, 2016, invented by Kevin J. Ash et al., Total 19 pages.
Response to Office Action, dated Oct. 25, 2018, for U.S. Appl. No. 15/348,668 (18.683), filed Nov. 10, 2016, invented by Kevin J. Ash et al., Total 13 pages.
Notice of Allowance, dated Jan. 28, 2019, for U.S. Appl. No. 15/348,668 (18.683), filed Nov. 10, 2016, invented by Kevin J. Ash et al., Total 14 pages.

‡ imported from a related application

First exemplary adjustment of the number of cache storage scan and destage tasks

402

First phase

X denotes a predetermined base number of tasks, e.g. 16

Y is a constant, e.g., 5000

Number of cache storage scan and destage tasks determined in first phase =
X + [(number of hard disk drive elements) / Y] +
[2 * (number of solid state drive elements) /Y]

e.g., storage controller has 50000 hard disk drive elements and 50000 solid state drive elements e.g. 16 + (50000/5000) + (2 * 50000/5000) = 16+10+20 = 46

404

Second phase

Number of cache storage scan and destage tasks to use as determined in second phase =

Minimum of (number of number of available CPUs, number of scan storage scan and destage tasks determined in first phase)

Second exemplary adjustment of the number of cache storage scan and destage tasks

602

First phase

X denotes a predetermined base number of tasks, e.g. 16

Y is a constant, e.g., 5000

Number of cache storage scan and destage tasks determined in first phase =
X + [(number of first type of elements) / Y] +
[2 * (number of second type of elements) /Y]

e.g., storage controller has 50000 first type of elements and 50000 second type of elements e.g. 16 + (50000/5000) + (2 * 50000/5000) = 16+10+20 = 46

604

Second phase

Number of cache storage scan and destage tasks to use as determined in second phase =

Minimum of (number of number of available CPUs, number of scan storage scan and destage tasks determined in first phase)

ADJUSTMENT OF THE NUMBER OF TASKS FOR A CACHE STORAGE SCAN AND DESTAGE APPLICATION BASED ON THE TYPE OF ELEMENTS TO BE DESTAGED FROM THE CACHE STORAGE

CROSS-REFERENCE TO RELATED APPLICATION

This application is a continuation of U.S. patent application Ser. No. 15/348,668, filed Nov. 10, 2016 which application is incorporated herein by reference in its entirety.

BACKGROUND

1. Field

Embodiments relate to the adjustment of the number of tasks for a cache storage scan and destage application based on the type of elements to be destaged from the cache storage.

2. Background

A storage controller may control access to storage for one or more host computational devices that may be coupled to the storage controller over a network. The storage controller may include a cache storage, and a storage management application that executes in the storage controller may manage a plurality of secondary storage devices, such as disk drives, tape drives, flash drives, direct access storage devices (DASD), etc., where the secondary storage devices are coupled to the storage controller.

A host computational device may send Input/Output (I/O) commands to the storage controller and the storage controller may execute the I/O commands by using the cache storage of the storage controller and the secondary storage devices that are coupled to the storage controller.

While the cache storage is relatively fast in terms of I/O access in comparison to the secondary storage devices, the cache storage is relatively smaller in storage capacity in comparison to the secondary storage devices. Additionally, the cache storage may include volatile memory that may be lost in certain situations (e.g., in the event of a power failure). Therefore, the cache storage is periodically (e.g., every one hour) scanned and data that is modified by I/O commands in the cache storage are destaged (i.e., moved) from the cache storage to the secondary storage, to make room in the cache storage for satisfying new I/O commands and for safely securing the data. If there is data loss in the cache storage or data is unavailable in the cache storage, then the data may be retrieved from the secondary storage.

Summary of the Preferred Embodiments

Provided are a method, system, and computer program product in which a determination is made in a multi-processor system that a cache storage is storing a first type of elements and a second type of elements, wherein on an average each of the first type of elements takes a longer time to destage to secondary storage in comparison to each of the second type of elements. A determination is made of how many tasks to run for scanning the cache storage and destaging the first type of elements and the second type of elements from the cache storage, based on how many of first type of elements and how many of the second type of elements are stored in the cache storage, and how many processors are available in the multi-processor system.

In additional embodiments, the first type of elements are to be destaged to one or more hard disk drives, and the second type of elements are to be destaged to one or more solid state drives.

In certain embodiments, the first type of elements are to be destaged to randomly located tracks of one or more hard disk drives, and the second type of elements are to be destaged to one or more solid state drives or to sequentially located tracks of one or more hard disk drives.

In further embodiments, the determining of how many tasks to run is based on computing a function, wherein the function is at least a sum of a first number of tasks that is computed based on a number of the first type of elements, and a second number of tasks that is computed based on a number of the second type of elements, and wherein the second number of tasks that is computed is greater than the first number of tasks that is computed, in response to the first type of elements being equal in number to the second type of elements, and wherein a number of tasks to run is a lesser of a number of processors that are available in the multi-processor system and a computed valued of the function.

In yet further embodiments, if X is a predetermined base number of tasks, and Y is a constant, then a number of tasks to run equals a sum of X, a number of the first type of elements divided by Y, and twice of a number of the second type of elements divided by Y, if the sum of X, the number of the first type of elements divided by Y, and twice of the number of the second type of elements divided by Y is less than a number of processors available in the multi-processor system.

In additional embodiments, the first type of elements and the second type of elements that are destaged from the cache storage are elements that have been modified in the cache storage, subsequent to a previous scanning of the cache storage and a destaging from the cache storage.

In yet additional embodiments, the scanning of the cache storage and the destaging from the cache storage are performed at a periodic interval of time, wherein response time in the multi-processor system is maintained below a predetermined threshold by running the tasks for the scanning of the cache storage and the destaging from the cache storage at the periodic interval of time.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Certain embodiments adjust the number of tasks for periodically scanning a cache storage and destaging the modified elements of the cache storage to secondary storage. In certain embodiments, the adjustment is based on determining the number of the different types of elements that are being destaged from the cache storage to the secondary storage and the number of available central processing units. The adjustments allow for the balancing of expeditious scanning and destaging from the cache storage with maintaining of adequate response times to satisfy needs of users while the scanning and destaging from the cache storage is in progress.

Exemplary Embodiments

Figure 1:
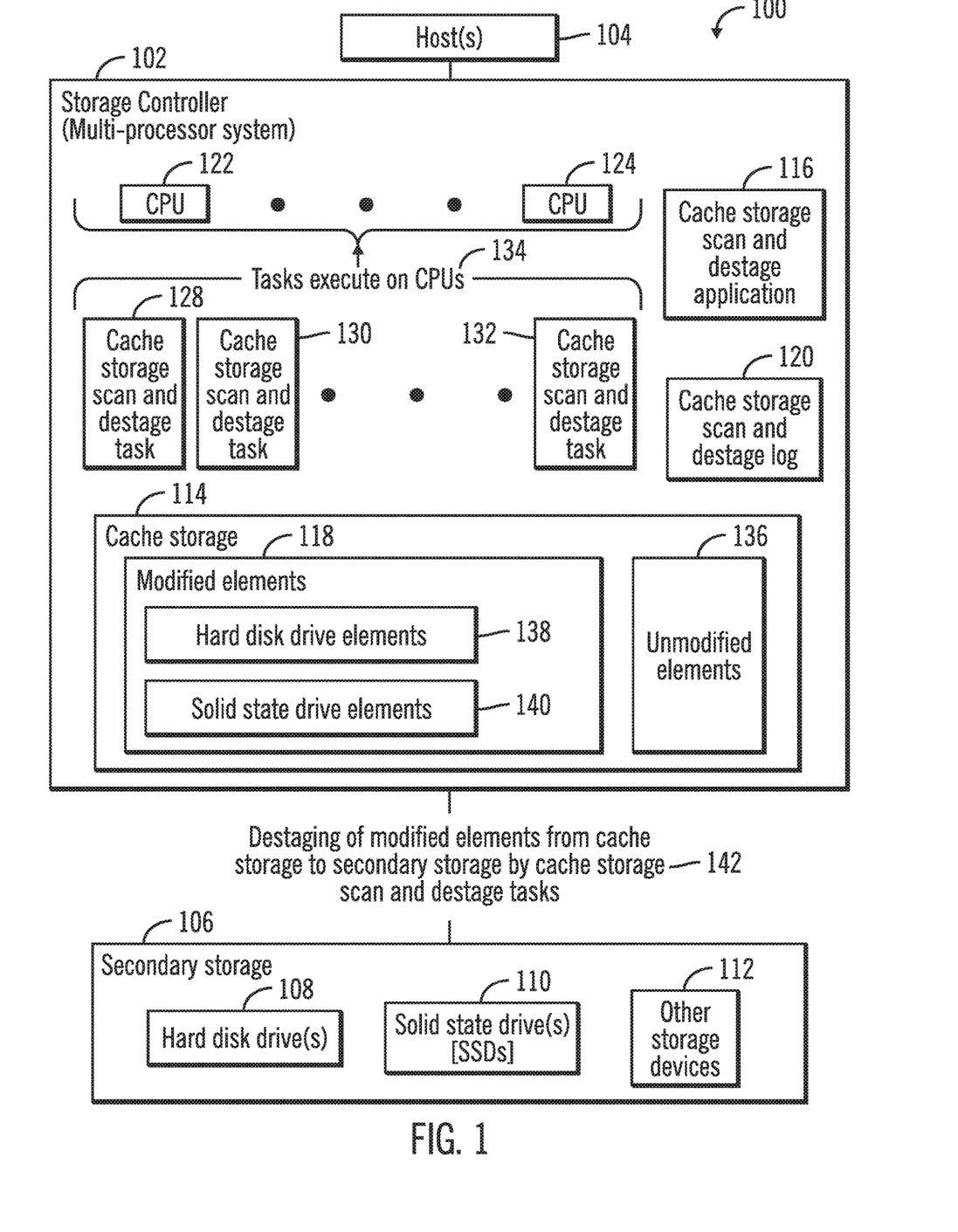
FIG. 1 illustrates a block diagram of a computing environment comprising a storage controller coupled to one or more hosts and secondary storage, in accordance with certain embodiments.

FIG. 1 illustrates a block diagram of a computing environment 100 comprising a storage controller 102 that is coupled to one or more hosts 104 and a secondary storage 106 that is comprised of hard disk drives 108, solid state drives 110, and other storage devices 112. The storage controller 102 receives I/O requests from the one or more hosts 104, and responds to the I/O requests by performing read or write operations with respect to storage volumes that are stored in the secondary storage 106. Some of the data of the storage volumes may also be temporarily found in the cache storage 114 included in the storage controller 102.

The storage controller 102 and the hosts 104 may comprise any suitable computational device including those presently known in the art, such as, a personal computer, a workstation, a server, a mainframe, a hand held computer, a palm top computer, a telephony device, a network appliance, a blade computer, a processing device, a controller, etc. The storage controller 102 and the hosts 104 may be elements in any suitable network, such as, a storage area network, a wide area network, the Internet, an intranet, etc. In certain embodiments, the storage controller 102 and the hosts 104 may be elements in a cloud computing environment.

In response to an I/O request from the host, the storage controller 102 first attempts to expeditiously satisfy the request from the cache storage 114, and if the request cannot be satisfied from the cache storage 114 then the storage controller stages (i.e., moves) data from the secondary storage 106 to the cache storage 114 to satisfy the I/O request.

The cache storage 114 may be comprised of a volatile and/or a non-volatile storage. For example, in certain embodiments the cache storage 114 may be comprised of dynamic random access memory (DRAM) and/or solid state memory. The secondary storage 106 has a much larger amount of storage capacity in comparison to the cache storage 114 and may be comprised of hard disk drives, solid state drives, or other storage devices. Typically, the cache storage 114 is coupled via a bus to the central processing units (CPUs) 122, 124 of the storage controller 102, and is accessed much faster in comparison to the secondary storage 106 that may be external to an enclosure of the storage controller 102.

Since the storage capacity of the cache storage 114 is much less than the storage capacity of the secondary storage 106, periodically (e.g. every one hour), a cache storage scan and destage application 116 is executed in the storage controller 102 to scan the cache storage 114 and destage modified elements 118 from the cache storage 114 to the secondary storage 106, where the modified elements 118 are those elements (e.g., tracks, extents, addresses, or any other unit in which data is maintained in the cache storage 114) that have been modified (e.g., by a write I/O) since the end of the immediate previous execution of the cache scan and destage application 116.

The time of the end of the executions of the cache scan and destage application 116 are saved in a data structure referred to as the cache storage scan and destage log 120. For example, when the cache storage scan and destage application 116 ends its execution, the time at which it ends its execution is recorded in the cache storage scan and destage log 120. Any data written to the cache storage 114 prior to this time is safely stored in the secondary storage 106, and if there is data loss then only data that was written after this time needs to be restored. In certain embodiments, the cache storage scan and destage application 116 may be implemented in software, hardware, firmware on any combination thereof.

The storage controller 102 is a multi-processor based system with a plurality of CPUs 122, 124. The cache storage scan and destage application 116 may execute a plurality of cache storage scan and destage tasks 128, 130, 132 on the CPUs 122, 124 (as shown via reference numeral 134) to utilize the multi-processing capabilities of the storage controller 102.

In certain embodiments, the cache storage 114 may have unmodified elements 136 in addition to the modified elements 118. The unmodified elements of the cache storage 114 are elements of the cache storage 114 that have not been modified (i.e., written on) since the ending time of the previous execution of the cache storage scan and destage application 116 as recorded in the cache storage scan and destage log 120.

The modified elements 118 of the cache storage 114 may include hard disk drive elements 138 that are to be destaged to the hard disk drives 108 of the secondary storage 106, and the modified elements 118 of the cache storage 114 may also include solid state drive elements 140 that are to be destaged to the solid state drives 110. Other types of elements may also be included in the modified elements 118 of the cache storage 114.

Therefore, FIG. 1 illustrates certain embodiments, in which the cache storage scan and destage application 116 periodically executes a plurality of tasks 128, 130, 132 on a plurality of CPUs 122, 124 to destage the modified elements 118 of the cache storage 114 to secondary storage 106 (as shown via reference numeral 142). In certain embodiments, the cache storage scan and destage application 116 calculates the number of cache storage scan and destage tasks to use, to avoid excessively slow response times to commands being executed in the storage controller 102 while at the same time completing the cache storage scan and destage application 116 expeditiously.

Figure 2:
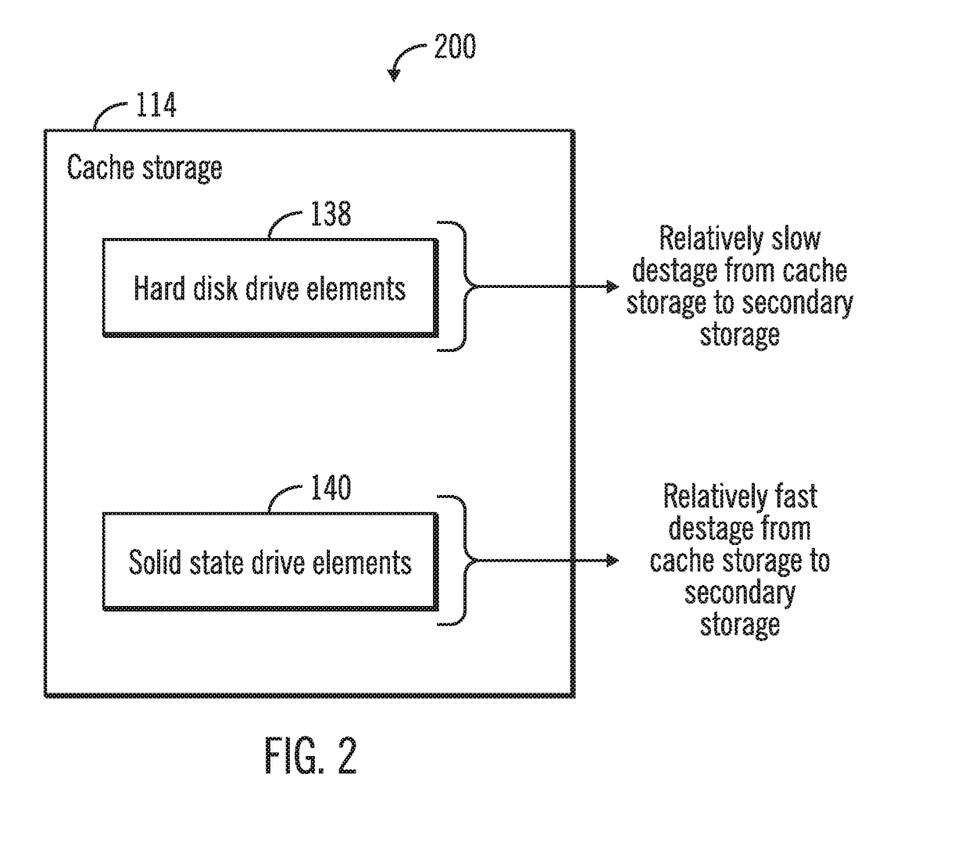
FIG. 2 illustrates a block diagram that shows the destaging of hard disk drive elements and solid state drive elements from cache storage, in accordance with certain embodiments.

FIG. 2 illustrates a block diagram 200 that shows the destaging of hard disk drive elements 138 and solid state drive elements 140 from cache storage 114, in accordance with certain embodiments.

The destage of the hard disk drive elements 138 may be relatively slow from cache storage 114 to the hard disk drives 108 of the secondary storage 106, in comparison to the destage of the solid state drive elements 140 from the cache storage 114 to the solid stage drives 110 of the secondary storage 106, because the access and writing of data to the hard disk drives 108 takes considerably longer than the access and writing of data to the solid state drives 110. There are no moving parts to a solid state drive, and data may be stored in NAND or any other type of flash memory. However, a hard disk drive uses a mechanical arm with a read/write head to move around and read information from the right location on a storage platter. As a result, the access and writing to the solid state drives 110 is much faster is comparison to the access and writing to the hard disk drives 108.

Figure 3:
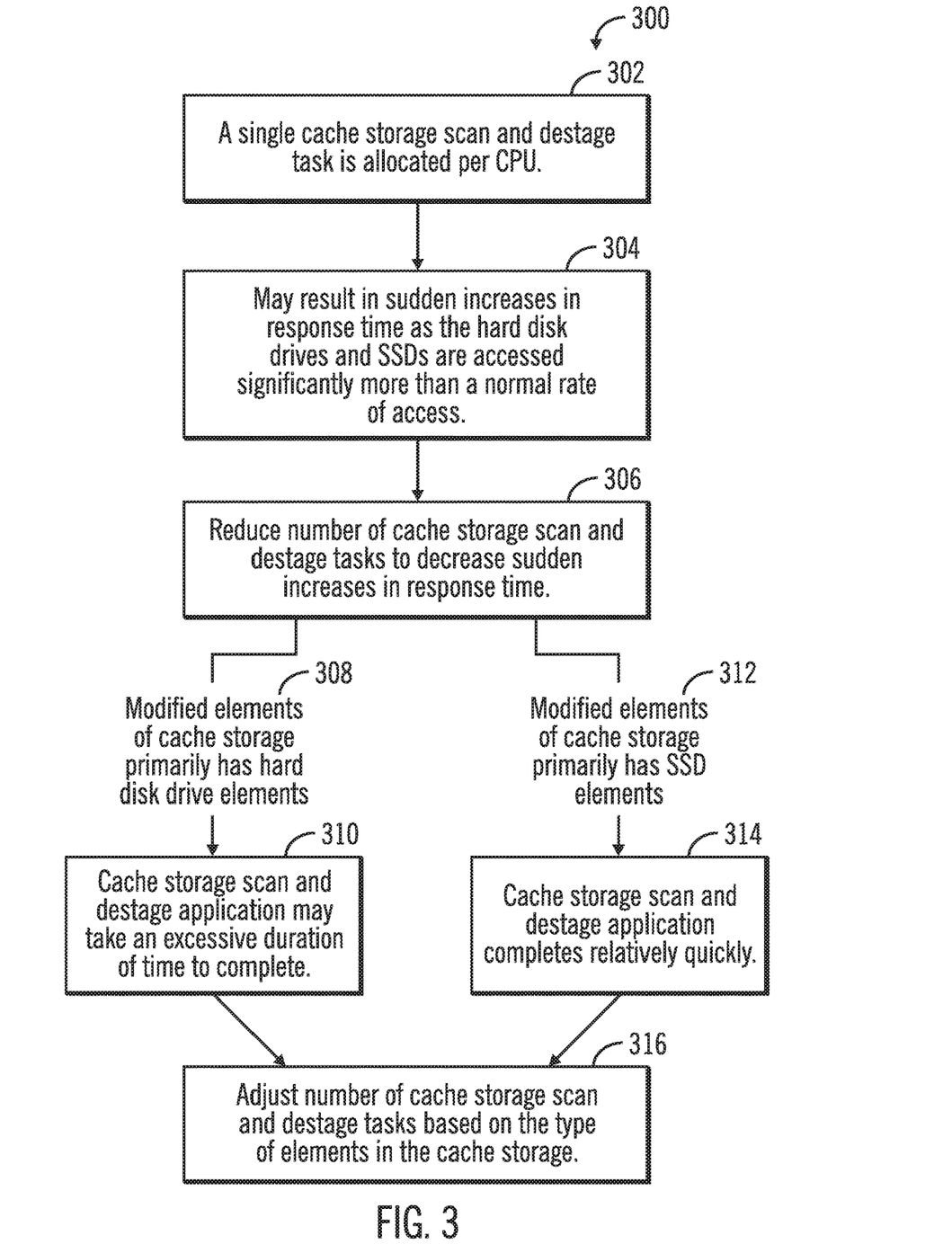
FIG. 3 illustrates a flowchart that shows the rationale for adjusting the number of cache storage scan and destage tasks based on the type of elements in cache storage, in accordance with certain embodiments.

FIG. 3 illustrates a flowchart 300 that shows the rationale for adjusting the number of cache storage scan and destage tasks 128, 130, 132 based on the type of elements in the cache storage 114, in accordance with certain embodiments.

Control starts at block 302 in which a single cache storage scan and destage task is allocated per CPU (i.e., a plurality of cache storage scan and destage tasks 128, 130, 132 equal in to number to the number of CPUs 122, 124 are executed in parallel). Such a condition in which a plurality of cache storage scan and destage tasks are being used may result in sudden increases in response time (shown via reference numeral 304) to complete commands in the storage controller 102, as the hard disk drives 108 and the solid state drives 110 may be accessed at a significantly higher rate in parallel, than in a normal rate of access of the hard disk drives 108 and solid stage drives 110 via a single cache storage scan and destage task or via cache storage scan and destage scans that are fewer than the number of CPUs 122, 124. So running an excessive number of cache storage scan and tasks 128, 130, 132 in parallel may cause the destaging operations to complete faster at the cost of spikes (i.e., sudden increases) in the response times for execution of other commands.

In certain situations, the number of cache storage scan and destage tasks may be reduced (as shown via reference numeral 306) to decrease the number of spikes in the response times. However, if the modified elements 118 of the cache storage 114 primarily has hard disk drive elements (shown via reference numeral 308) then the cache storage scan and destage application 116 may take an excessive amount of time to complete (shown via reference numeral 310). In contrast, if the modified elements 118 of the cache storage 114 primarily has SSD elements 140 then the cache storage scan and destage application 116 may complete relatively quickly.

Certain embodiments provide mechanisms to adjust the number of cache storage scan and destage tasks based on the type of elements (e.g., hard disk drive elements, solid state drive elements, etc.) in the cache storage 114 (as shown via reference numeral 316).

Figure 4:
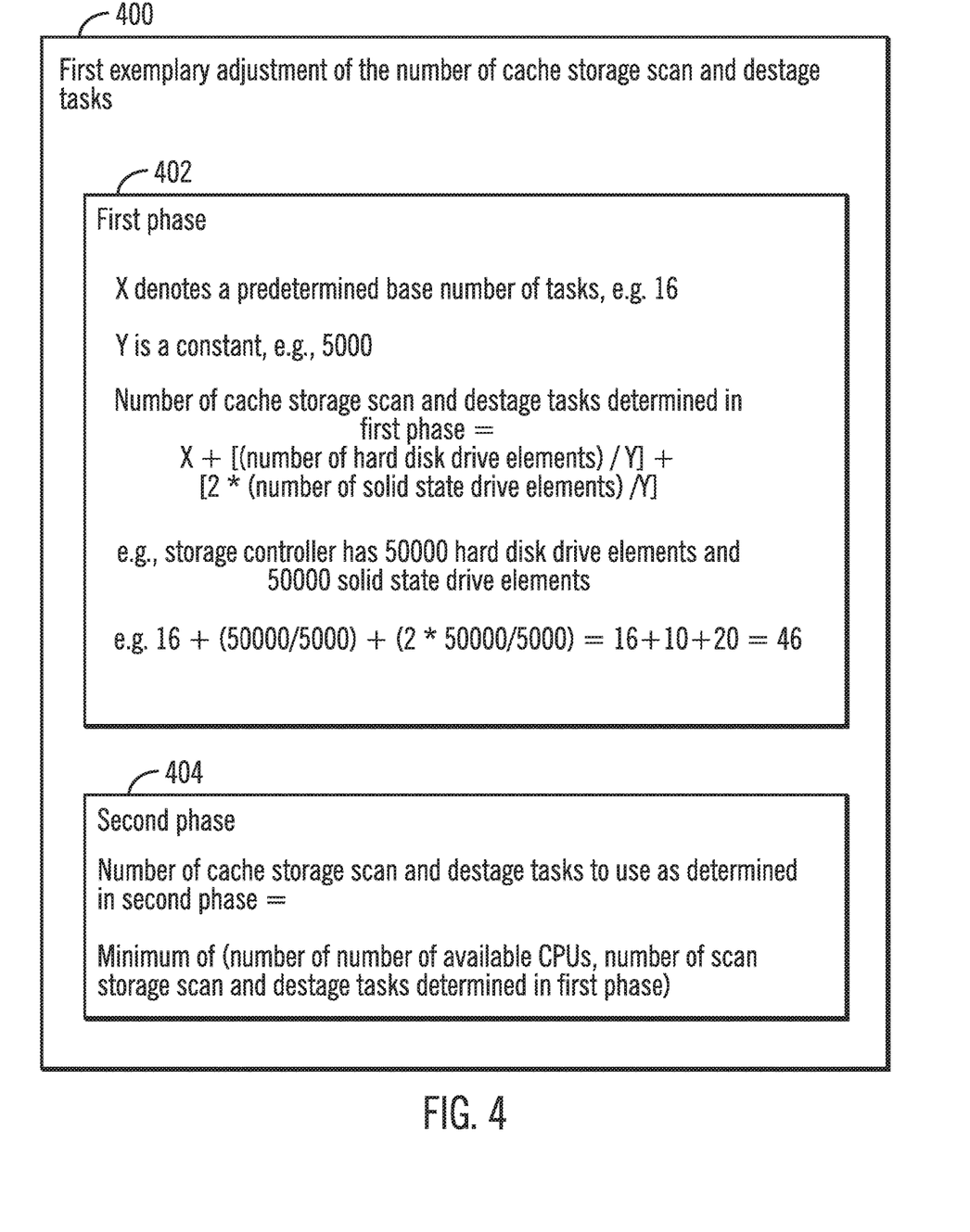
FIG. 4 illustrates a first exemplary adjustment of the number of cache storage scan and destage tasks, in accordance with certain embodiments.

FIG. 4 illustrates a block diagram 400 that shows a first exemplary adjustment of the number of cache storage scan and destage tasks, in accordance with certain embodiments. In certain embodiments, the adjustment shown in FIG. 4 may be performed by internal logic implemented within the cache storage scan and destage application 116.

In certain embodiments, in a first phase 402, if X denotes a predetermined base number of tasks (e.g. 16), and Y is a constant (e.g., 5000), then the number of cache storage scan and destage tasks is calculated to be equal to X+[(number of hard disk drive elements)/Y]+[2*(number of solid state drive elements) Y].

If the storage controller has 50,000 hard disk drive elements and 50,000 solid state drive elements, then in the first exemplary embodiment in the first phase the number of cache storage scan and destage tasks is calculated to be 16+(50000/5000)+(2*50000/5000) which equals 16+10+20 which equals 46.

In the second phase 404, the calculated number of cache storage scan and destage tasks of the first phase is compared to the number of CPUs 122. 124 in the storage controller 102. If the calculated number of cache storage scan and destage tasks of the first phase is less than the number of CPUs 122, 124 in the storage controller 102, then the calculated number of cache storage scan and destage tasks of the first phase is used for running the cache storage scan and destage application 116, otherwise all CPUs 122, 124 are used for running the cache storage scan and destage application 116, Therefore, in the example above, if the number of CPUs are sixty (which is more than the number of calculated number of caches storages scans and destage tasks of the first phase), then forty six cache storage scan and destage tasks 128, 130, 132 are executed on the CPUs 122, 124 to execute the cache storage scan and destage application expeditiously without causing spikes in response time in the storage controller 102. Some CPUs remain unutilized for running the cache storage scan and destage application.

Figure 5:
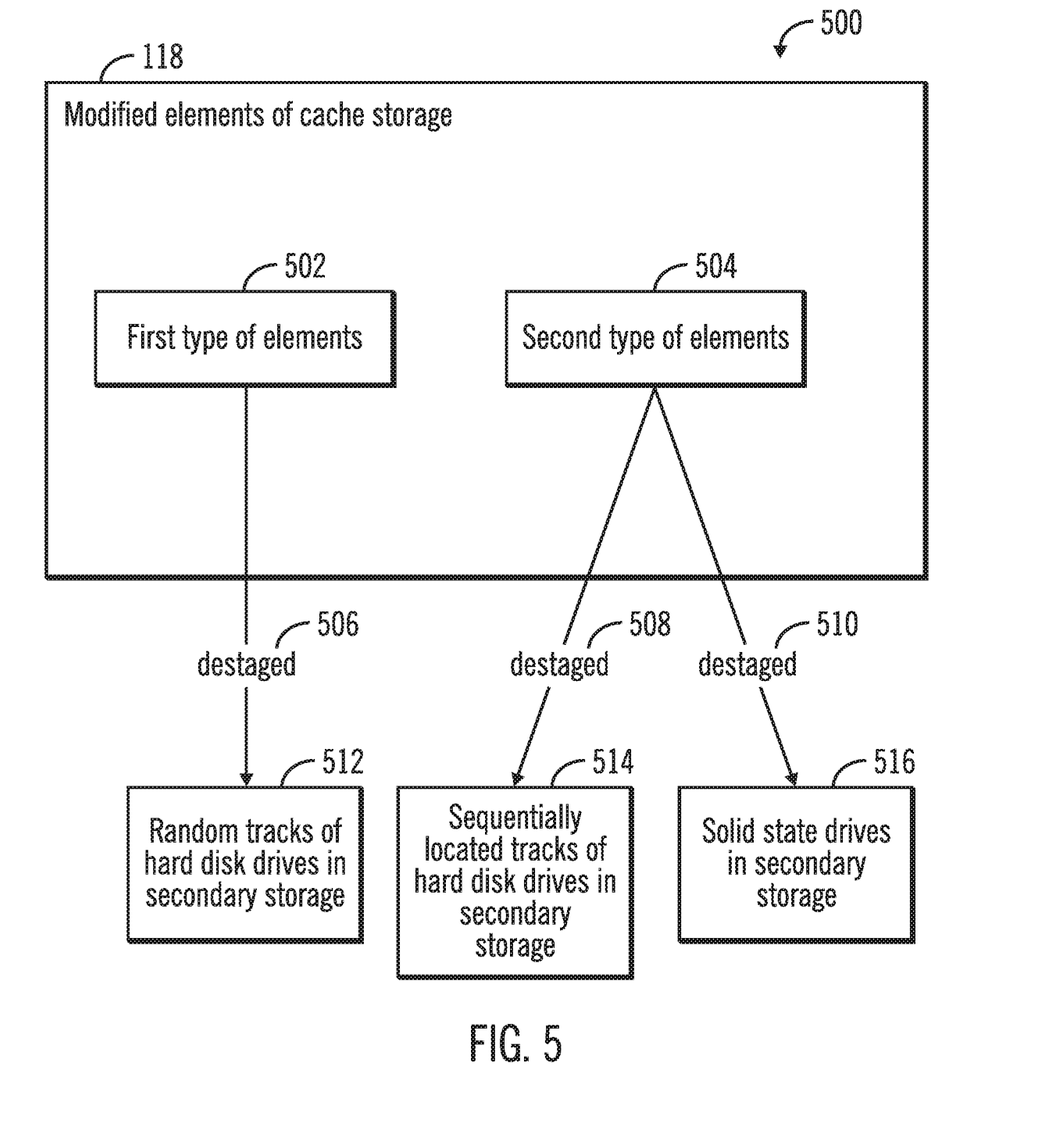
FIG. 5 illustrates a block diagram of different types of modified elements in cache storage that are to be destaged, in accordance with certain embodiments.

FIG. 5 illustrates a block diagram 500 of different types of modified elements in cache storage that are to be destaged, in accordance with certain embodiments. The modified elements 118 of the cache storage 114 may include a first type of elements 502 and a second type of elements 504. The first type of elements 502 take longer to destage 506 in comparison to the destage 508, 510 of the second type of elements 504, as the first type of elements 502 are destaged to random tracks of hard disk drives in secondary storage (reference numeral 512), whereas the second type of elements 504 are destaged to sequentially located tracks of hard disk drives in secondary storage (reference numeral 514) or to solid stage drives in secondary storage (reference numeral 516). It should be noted that writes to sequentially located tracks of hard disk drives is much faster in comparison to writes to randomly located tracks of hard disk drives.

In FIG. 5, the first type of elements 502 and the second type of elements 504 that are destaged from the cache storage 114 are elements that have been modified in the cache storage 114, subsequent to a previous scanning of the cache storage 114 and a destaging from the cache storage 114. The scanning of the cache storage 114 and the destaging from the cache storage 114 are performed at a periodic interval of time, wherein response time in the multi-processor system 102 is maintained below a predetermined threshold by running the tasks for the scanning of the cache storage and the destaging from the cache storage at the periodic interval of time.

Figure 6:
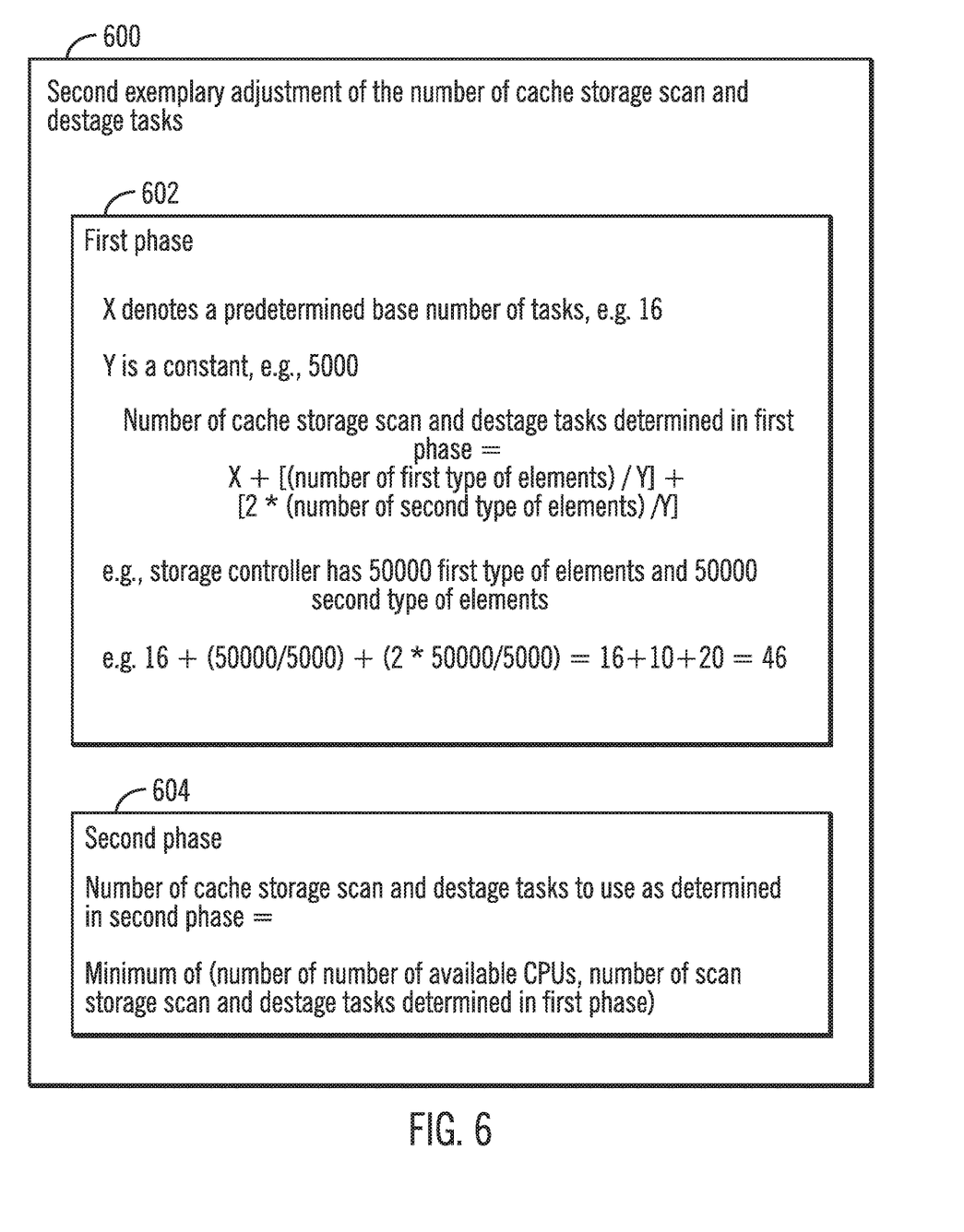
FIG. 6 illustrates a second exemplary adjustment of the number of cache storage scan and destage tasks, in accordance with certain embodiments.

FIG. 6 illustrates a block diagram 600 that shows a second exemplary adjustment of the number of cache storage scan and destage tasks, in accordance with certain embodiments. In certain embodiments, the adjustment shown in FIG. 6 may be performed by internal logic implemented within the cache storage scan and destage application 116.

In certain embodiments, in a first phase 602, if X denotes a predetermined base number of tasks (e.g. 16), and Y is a constant (e.g., 5000), then the number of cache storage scan and destage tasks is calculated to be equal to X+[(number of the first type of elements)/Y]+[2*(number of the second type of elements)/Y], where the first type of elements 502 and the second type of elements 504 were shown earlier in FIG. 5.

If the storage controller has 50,000 first type of elements 502 and 50,000 second type of elements 504, then in the first phase 602 of the second exemplary embodiment the number of cache storage scan and destage tasks is calculated to be 16+(50000/5000)+(2*50000/5000) which equals 16+10+20 which equals 46.

In the second phase 604, the calculated number of cache storage scan and destage tasks of the first phase is compared to the number of CPUs 122, 124 in the storage controller 102. If the calculated number of cache storage scan and destage tasks of the first phase is less than the number of CPUs 122, 124 in the storage controller 102, then the calculated number of cache storage scan and destage tasks of the first phase is used for running the cache storage scan and destage application 116, otherwise all CPUs 122, 124 are used for running the cache storage scan and destage application 116, Therefore, in the example above, if the number of CPUs are sixty (which is more than the number of calculated number of caches storages scans and destage tasks of the first phase), then forty six cache storage scan and destage tasks 128, 130, 132 are executed on the CPUs 122, 124 to execute the cache storage scan and destage application expeditiously without causing spikes in response time in the storage controller 102. Some CPUs remain unutilized for running the cache storage scan and destage application.

Therefore FIG. 6 shows that the determining of how many tasks 128, 130. 132 to run is based on computing a function, where the function is at least a sum of a first number of tasks that is computed based on a number of the first type of elements, and a second number of tasks that is computed based on a number of the second type of elements, where the second number of tasks that is computed is greater than the first number of tasks that is computed (if on an average each of the second type of elements destage faster than each of the first type of elements), in response to the first type of elements being equal in number to the second type of elements, and where a number of tasks to run is a lesser of a number of processors that are available in the multi-processor system and a computed valued of the function.

FIG. 6 also shows that if X is a predetermined base number of tasks, and Y is a constant, then a number of tasks 128, 130. 132 to run equals a sum of X, a number of the first type of elements divided by Y, and twice of a number of the second type of elements divided by Y, if the sum of X, the number of the first type of elements divided by Y, and twice of the number of the second type of elements divided by Y is less than a number of processors available in the multi-processor system.

Figure 7:
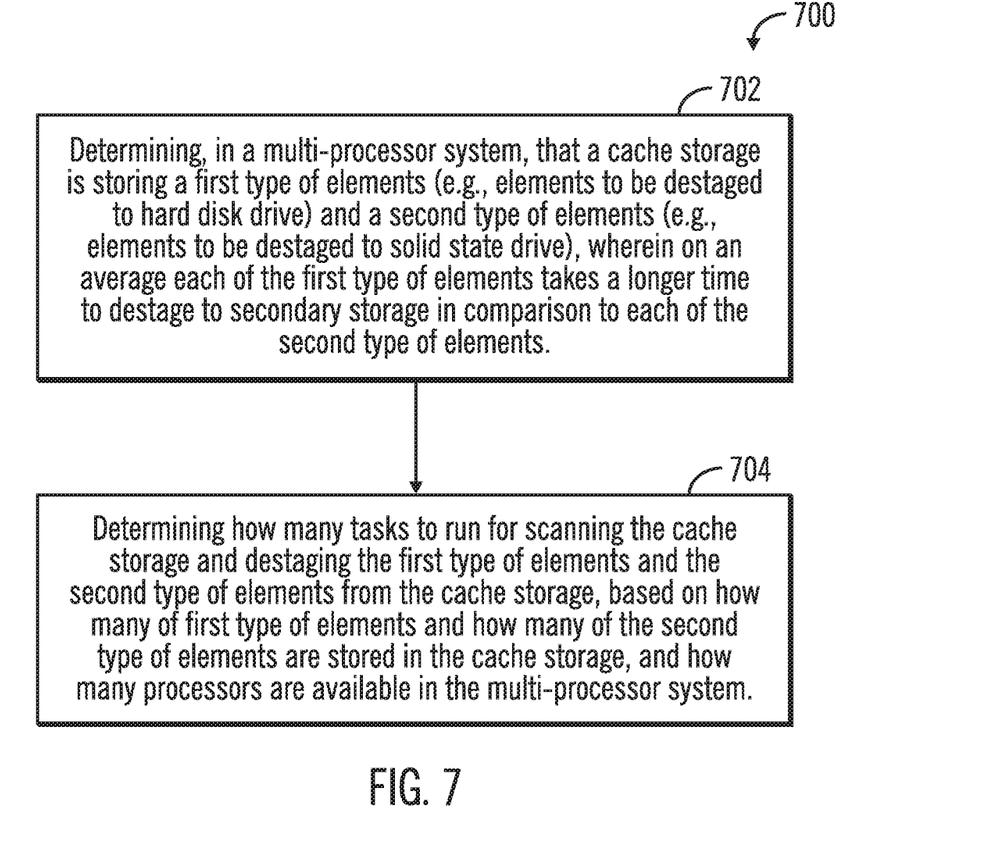
FIG. 7 illustrates a flowchart that shows the adjustment of the number of tasks for a cache storage scan and destage application based on the type of elements to be destaged from the cache storage, in accordance with certain embodiments.

FIG. 7 illustrates a flowchart 700 that shows the adjustment of the number of tasks for a cache storage scan and destage application based on the type of elements to be destaged from the cache storage, in accordance with certain embodiments. In certain embodiments, the operations shown in FIG. 7 may be performed by internal logic implemented within the cache storage scan and destage application 116.

Control starts at block 702 in which a determination is made in a multi-processor system (e.g., storage controller 102) that a cache storage 114 is storing a first type of elements 502 and a second type of elements 504, wherein on an average each of the first type of elements takes a longer time to destage to secondary storage 106 in comparison to each of the second type of elements. A determination is made (at block 704) of how many tasks to run for scanning the cache storage and destaging the first type of elements and the second type of elements from the cache storage 114, based on how many of first type of elements and how many of the second type of elements are stored in the cache storage 114, and how many processors are available in the multi-processor system.

In additional embodiments, the first type of elements are to be destaged to one or more hard disk drives 108, and the second type of elements are to be destaged to one or more solid state drives 110.

In certain embodiments, the first type of elements are to be destaged to randomly located tracks of one or more hard disk drives (reference numeral 512), and the second type of elements are to be destaged to one or more solid state drives (reference numeral 516) or to sequentially located tracks of one or more disk drives (reference numeral 514).

Therefore, certain embodiments shown in FIGS. 1-7 adjust the number of tasks for periodically scanning a cache storage and destaging the modified elements of the cache storage to secondary storage to balance expeditious scanning and destaging from the cache storage with suitable response times to satisfy needs of users while the scanning and destaging from the cache storage is in progress.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 8:
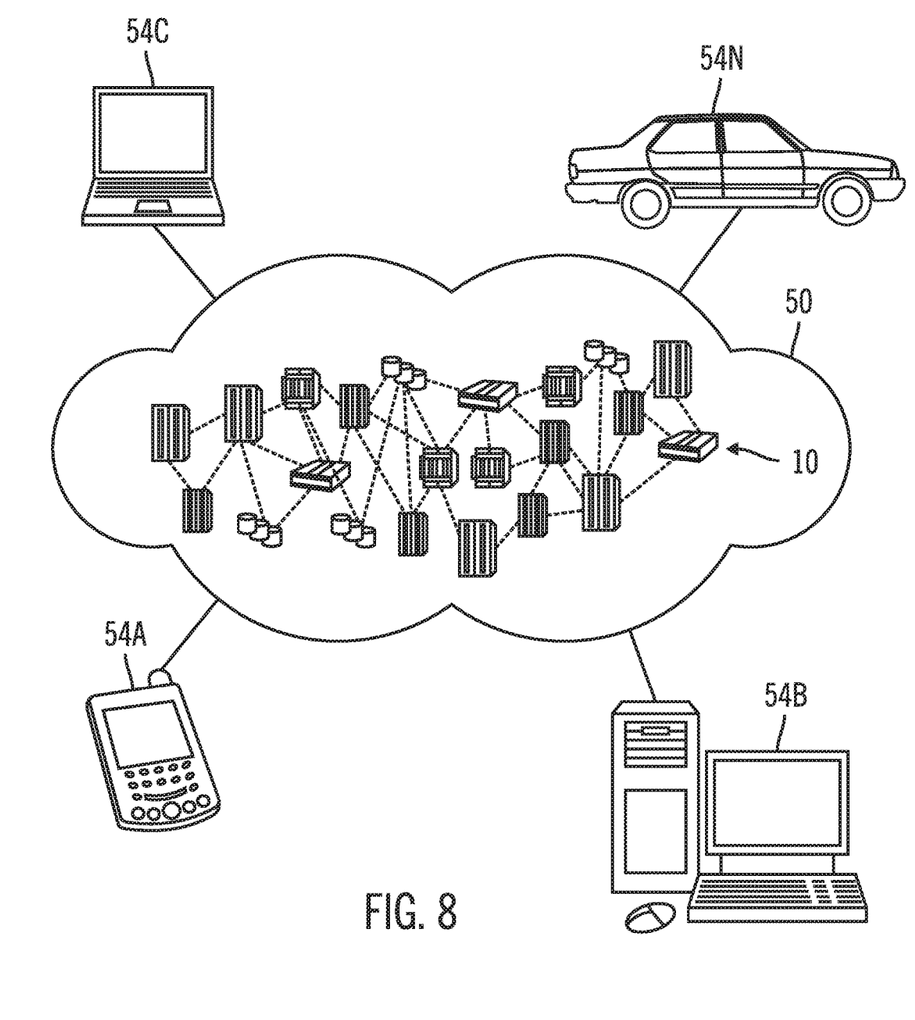
FIG. 8 illustrates a block diagram of a cloud computing environment, in accordance with certain embodiments.

Referring now to FIG. 8, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community. Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
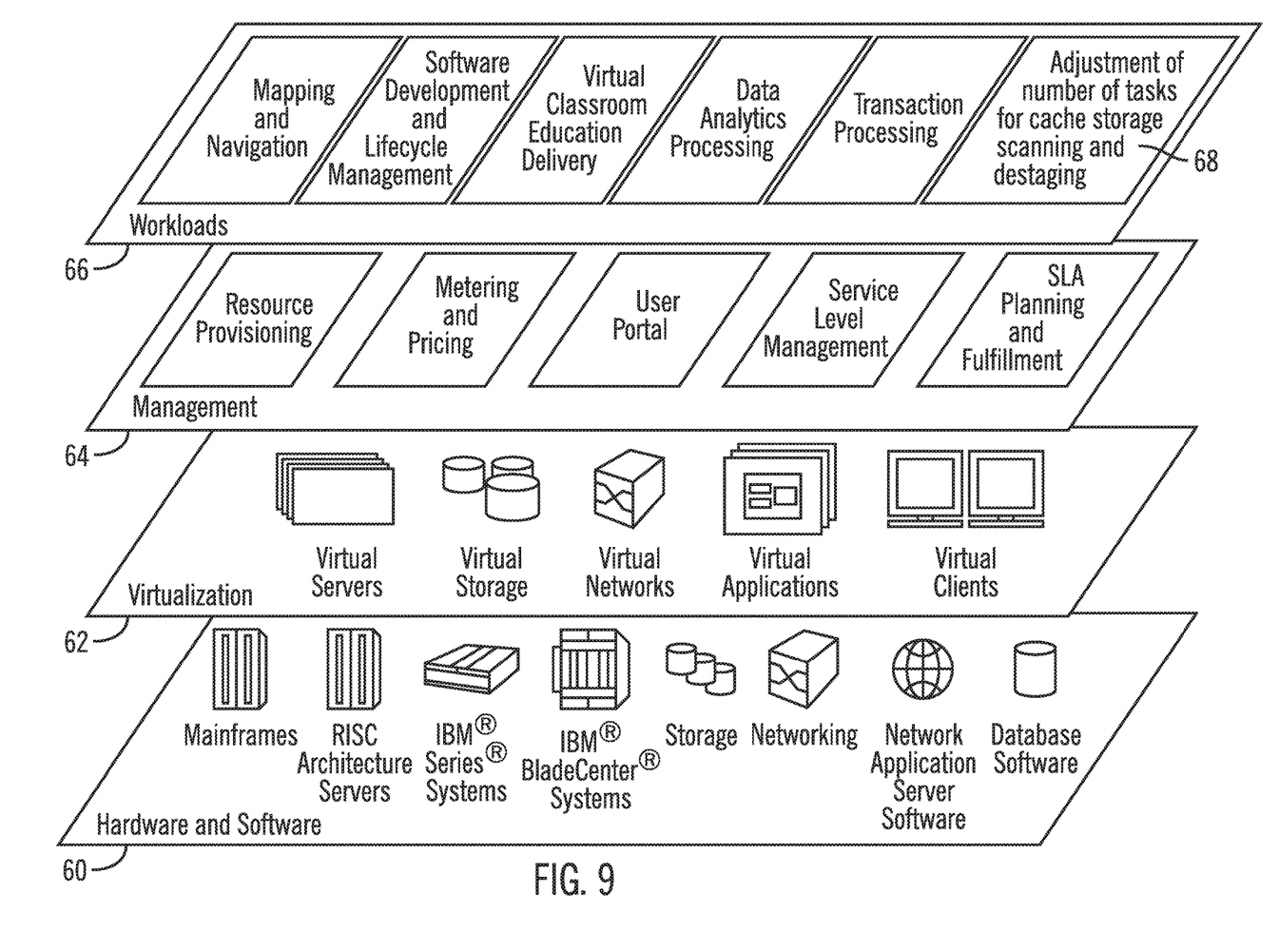
FIG. 9 illustrates a block diagram of further details of the cloud computing environment of FIG. 8, in accordance with certain embodiments.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

* IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses.

Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and adjustment of number of tasks for cache storage scanning and destaging 68 as shown in FIGS. 1-8.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit." "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 10:
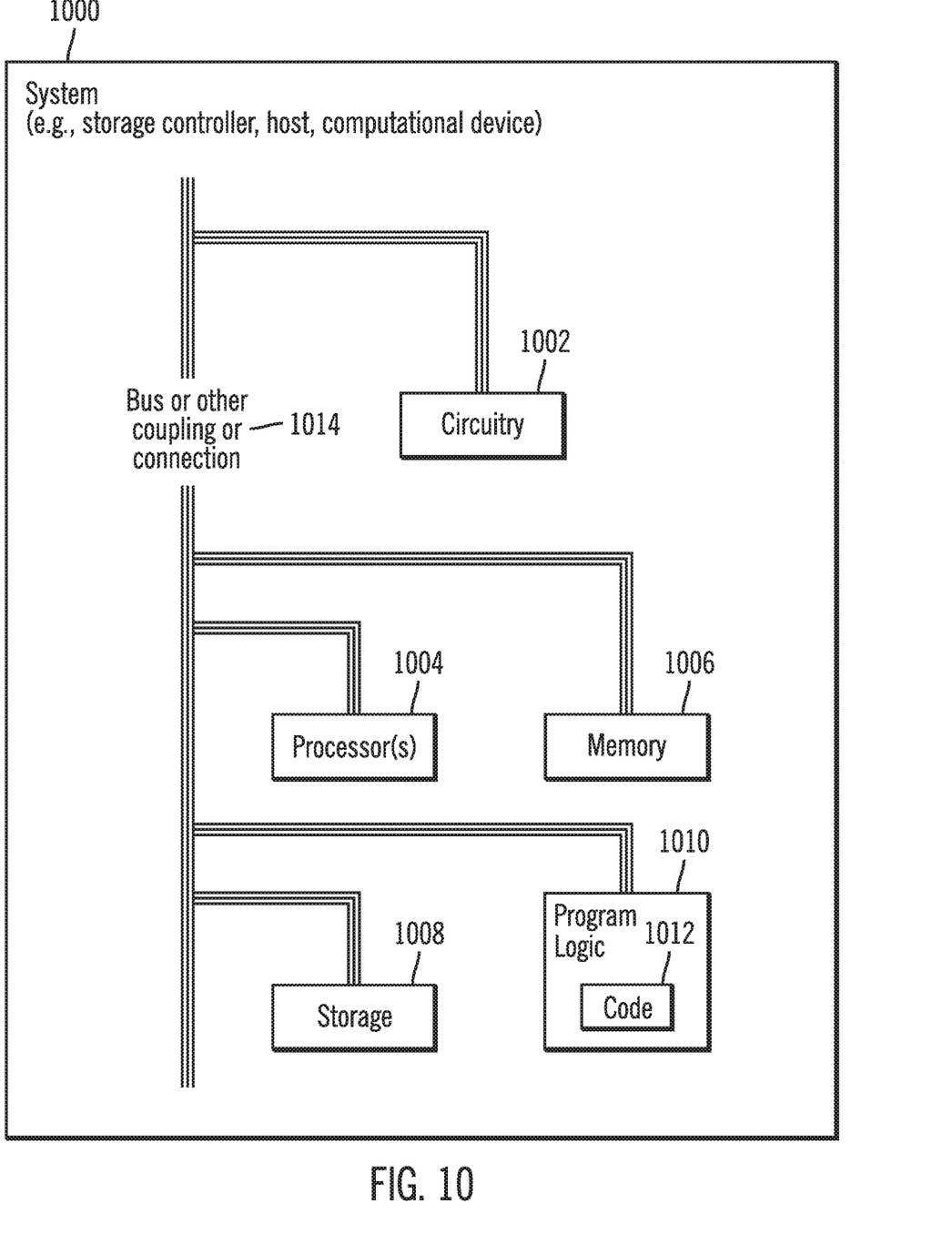
FIG. 10 illustrates a block diagram of a computational system that shows certain elements that may be included in the storage controllers and/or the host(s), as described in FIGS. 1-9, in accordance with certain embodiments.

FIG. 10 illustrates a block diagram that shows certain elements that may be included in the storage controller 102, the host 104, or other computational devices in accordance with certain embodiments. The system 1000 may include a circuitry 1002 that may in certain embodiments include at least a processor 1004. The system 1000 may also include a memory 1006 (e.g., a volatile memory device), and storage 1008. The storage 1008 may include a non-volatile memory device (e.g., EEPROM, ROM, PROM, flash, firmware, programmable logic, etc.), magnetic disk drive, optical disk drive, tape drive, etc. The storage 1008 may comprise an internal storage device, an attached storage device and/or a network accessible storage device. The system 1000 may include a program logic 1010 including code 1012 that may be loaded into the memory 1006 and executed by the processor 1004 or circuitry 1002. In certain embodiments, the program logic 1010 including code 1012 may be stored in the storage 1008. In certain other embodiments, the program logic 1010 may be implemented in the circuitry 1002. One or more of the components in the system 1000 may communicate via a bus or via other coupling or connection 1014. Therefore, while FIG. 10 shows the program logic 1010 separately from the other elements, the program logic 1010 may be implemented in the memory 1006 and/or the circuitry 1002.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
determining, in a multi-processor system, that a cache storage is storing a first type of elements and a second type of elements, wherein on an average each of the first type of elements takes a longer time to destage to secondary storage in comparison to each of the second type of elements; and
determining how many tasks to run for scanning the cache storage and destaging the first type of elements and the second type of elements from the cache storage, based on how many of first type of elements and how many of the second type of elements are stored in the cache storage, and how many processors are available in the multi-processor system, wherein determining of how many tasks to run is based on computing a function that is at least a sum of a first number of tasks that is computed based on a number of the first type of elements, and a second number of tasks that is computed based on a number of the second type of elements.

2. The method of claim 1, wherein the first type of elements are to be destaged to one or more hard disk drives, and wherein the second type of elements are to be destaged to one or more solid state drives.

3. The method of claim 1, wherein the first type of elements are to be destaged to randomly located tracks of one or more hard disk drives, and wherein the second type of elements are to be destaged to one or more solid state drives or to sequentially located tracks of one or more hard disk drives.

4. The method of claim 1, wherein the first type of elements and the second type of elements that are destaged from the cache storage are elements that have been modified in the cache storage, subsequent to a previous scanning of the cache storage and a destaging from the cache storage.

5. The method of claim 1, wherein the scanning of the cache storage and the destaging from the cache storage are performed at a periodic interval of time, and wherein response time in the multi-processor system is maintained below a predetermined threshold by running the tasks for the scanning of the cache storage and the destaging from the cache storage at the periodic interval of time.

6. A system, comprising:
a memory; and
a processor coupled to the memory, wherein the processor performs operations, the operations comprising:
determining that a cache storage is storing a first type of elements and a second type of elements, wherein on an average each of the first type of elements takes a longer time to destage to secondary storage in comparison to each of the second type of elements; and
determining how many tasks to run for scanning the cache storage and destaging the first type of elements and the second type of elements from the cache storage, based on how many of first type of elements and how many of the second type of elements are stored in the cache storage, and how many processors are available in the multi-processor system, wherein determining of how many tasks to run is based on computing a function that is at least a sum of a first number of tasks that is computed based on a number of the first type of elements, and a second number of tasks that is computed based on a number of the second type of elements.

7. The system of claim 6, wherein the first type of elements are to be destaged to one or more hard disk drives, and wherein the second type of elements are to be destaged to one or more solid state drives.

8. The system of claim 6, wherein the first type of elements are to be destaged to randomly located tracks of one or more hard disk drives, and wherein the second type of elements are to be destaged to one or more solid state drives or to sequentially located tracks of one or more hard disk drives.

9. The system of claim 6, wherein the first type of elements and the second type of elements that are destaged from the cache storage are elements that have been modified in the cache storage, subsequent to a previous scanning of the cache storage and a destaging from the cache storage.

10. The system of claim 6, wherein the scanning of the cache storage and the destaging from the cache storage are performed at a periodic interval of time, and wherein response time in the multi-processor system is maintained below a predetermined threshold by running the tasks for the scanning of the cache storage and the destaging from the cache storage at the periodic interval of time.

11. A computer program product, the computer program product comprising a computer readable storage medium having computer readable program code embodied therewith, the computer readable program code configured to perform operations, the operations comprising:
determining, in a multi-processor system, that a cache storage is storing a first type of elements and a second type of elements, wherein on an average each of the first type of elements takes a longer time to destage to secondary storage in comparison to each of the second type of elements; and
determining how many tasks to run for scanning the cache storage and destaging the first type of elements and the second type of elements from the cache storage, based on how many of first type of elements and how many of the second type of elements are stored in the cache storage, and how many processors are available in the multi-processor system, wherein determining of how many tasks to run is based on computing a function that is at least a sum of a first number of tasks that is computed based on a number of the first type of elements, and a second number of tasks that is computed based on a number of the second type of elements.

12. The computer program product of claim 11, wherein the first type of elements are to be destaged to one or more hard disk drives, and wherein the second type of elements are to be destaged to one or more solid state drives.

13. The computer program product of claim 11, wherein the first type of elements are to be destaged to randomly located tracks of one or more hard disk drives, and wherein the second type of elements are to be destaged to one or more solid state drives or to sequentially located tracks of one or more hard disk drives.

14. The computer program product of claim 11, wherein the first type of elements and the second type of elements that are destaged from the cache storage are elements that have been modified in the cache storage, subsequent to a previous scanning of the cache storage and a destaging from the cache storage.

15. The computer program product of claim 11, wherein the scanning of the cache storage and the destaging from the cache storage are performed at a periodic interval of time, and wherein response time in the multi-processor system is maintained below a predetermined threshold by running the tasks for the scanning of the cache storage and the destaging from the cache storage at the periodic interval of time.

* * * * *